US008327691B2

(12) United States Patent
Drane et al.

(10) Patent No.: US 8,327,691 B2
(45) Date of Patent: Dec. 11, 2012

(54) VACUUM DECAY TESTING METHOD

(75) Inventors: Robin J. Drane, Maldon (GB); Nick Wright, Canvey Island (GB)

(73) Assignee: Ford Global Technologies, LLC, Dearborn, MI (US)

( * ) Notice: Subject to any disclaimer, the term of this patent is extended or adjusted under 35 U.S.C. 154(b) by 446 days.

(21) Appl. No.: 12/552,874

(22) Filed: Sep. 2, 2009

(65) Prior Publication Data

US 2010/0064774 A1 Mar. 18, 2010

(30) Foreign Application Priority Data

Sep. 12, 2008 (GB) .................................. 0816694.4

(51) Int. Cl.
*G01M 3/04* (2006.01)

(52) U.S. Cl. ............................ 73/49.7; 73/49.2; 73/49.3

(58) Field of Classification Search ................... 73/49.2, 73/49.3, 49.7
See application file for complete search history.

(56) References Cited

U.S. PATENT DOCUMENTS

| | | | | |
|---|---|---|---|---|
| 5,437,257 | A | 8/1995 | Giacomazzi et al. | |
| 6,016,690 | A | 1/2000 | Cook et al. | |
| 6,073,487 | A | 6/2000 | Dawson | |
| 6,089,081 | A * | 7/2000 | Cook et al. | 73/114.39 |
| 6,343,505 | B1 * | 2/2002 | Cook et al. | 73/114.39 |
| 6,722,189 | B2 * | 4/2004 | Fabre | 73/114.39 |
| 6,823,850 | B1 | 11/2004 | Hurley | |
| 6,935,317 | B2 * | 8/2005 | Wiesenberger et al. | 123/519 |
| 7,047,950 | B2 | 5/2006 | Hurley | |
| 7,216,636 | B2 | 5/2007 | Hurley | |
| 7,350,512 | B1 * | 4/2008 | Meacham et al. | 123/520 |
| 7,532,560 | B2 * | 5/2009 | Lin et al. | 369/124.11 |
| 2001/0042399 | A1 * | 11/2001 | Dawson et al. | 73/49.7 |
| 2002/0026826 | A1 * | 3/2002 | Cook et al. | 73/118.1 |
| 2005/0044942 | A1 | 3/2005 | Amano et al. | |
| 2005/0257780 | A1 * | 11/2005 | Suzuki | 123/519 |

FOREIGN PATENT DOCUMENTS

| | | |
|---|---|---|
| JP | 9218071 | 8/1997 |
| JP | 2003-056416 | 2/2003 |

OTHER PUBLICATIONS

ISA Intellectual Property Office, Search Report of GB0816694.4, Jan. 12, 2009, Great Britain, 2 pages.

* cited by examiner

*Primary Examiner* — Daniel Larkin
(74) *Attorney, Agent, or Firm* — Julia Voutyras; Alleman Hall McCoy Russell & Tuttle LLP

(57) ABSTRACT

A method and system are disclosed for determining whether a leak is present in an evaporative emission control system 10 for on-board diagnostic purposes. The method comprises predicting for a leak of predetermined size the time period required for the vacuum to fall from a predicted starting vacuum to a predetermined level of vacuum at which the state of a switch changes, checking at the end of the time period the state of the switch and using the state of the switch as an indication of whether a leak greater than the predetermined size is present in the evaporative emission control system.

2 Claims, 7 Drawing Sheets

| LEAK | TOTAL NO OF TESTS | SYSTEM SEALED | LEAK DETECTED | NO RESULT |
|---|---|---|---|---|
| 0 | 49 | 31 | 0 | 18 |
| 0.25mm | 79 | 25 | 11 | 43 |
| 0.5mm | 23 | 0 | 5 | 18 |

FIG. 5

| LEAK | TOTAL NO OF TESTS | SYSTEM SEALED | LEAK DETECTED | NO RESULT |
|---|---|---|---|---|
| 0.25mm | 121 | 108 | 1 | 12 |
| 0.5mm | 138 | 0 | 130 | 8 |

FIG. 6

VACUUM DECAY TESTING METHOD

CROSS REFERENCE TO PRIORITY APPLICATION

The present application claims priority to United Kingdom Patent Application No. 0816694.4, filed Sep. 12, 2008, titled “A Vacuum Decay Testing Method”, the entire contents of each of which are incorporated herein by reference.

TECHNICAL FIELD

This description relates to a method for determining whether a leak is present in a closed system and in particular to detecting whether a leak is present in an evaporative control system of a motor vehicle for onboard diagnostic purposes

BACKGROUND AND SUMMARY

It is known to provide an evaporative emission control system for a motor vehicle in order to reduce the emissions produced by evaporation of the fuel.

In many countries regulations are in force requiring manufacturers to provide in-service detection and notification of leaks in the evaporative emission control system so as to minimise pollution.

In order to meet such regulations it is known to carry out a “natural vacuum leak detection test” (NVLD test) using a vacuum operated switch as shown in, for example U.S. Pat. Nos. 6,823,850, 7,047,950 and 7,216,636. The test uses the physical relationship between temperature and pressure which results in an increase in vacuum in a closed system if the temperature falls. Therefore, in a perfectly sealed system if the temperature falls the pressure will reduce and this reduction in pressure will result in the state of the vacuum operated switch changing thereby indicating an increase in vacuum in the system to a high vacuum state which can be used as an indicator that no leak is present. If, however, the system has a leak then air will flow into the system as the vacuum increases thereby reducing the level of vacuum that can be achieved due to the reduction in temperature and resulting in the state of the switch remaining in a low vacuum state.

In one embodiment of such a NVLD test for a system leak equivalent to a 0.5 mm diameter hole in the system, a vacuum operated switch is used in which the switch changes state at a vacuum of 2.5 mille bar (mb)[250 Pa] (−250 Pa from atmospheric) from an open state to a closed state. The vacuum at which the switch changes is known as the switching level or predetermined level of vacuum and a vacuum greater than this is known as a high vacuum and a vacuum less than the switching level is known as a low vacuum.

That is to say, if the switching level is a vacuum of 2.5 mille bar [250 Pa], then a high vacuum would be a vacuum greater than this such as four mille bar [400] and a low vacuum would be a vacuum less than the switching level such as for example 1.5 mille bar [150 Pa]. Therefore, the absolute pressure in the high vacuum range for a vacuum greater than the switching level is less than the absolute pressure in the low vacuum range which extends from the switching level to atmospheric pressure.

After engine switch off a delay of ten minutes is allowed for the system to stabilize and then the state of the switch is checked, if the switch is closed this indicates the presence of a high vacuum and the test is repeated after a time delay of ten minutes, if the switch is still closed the test is passed and no leak is considered to be present.

If upon conducting the first test of the switch, the state of the switch is open indicating low or no vacuum, the test is repeated at ten minute intervals for up to a further twenty-four hours and, provided the temperature has fallen at least six degrees Centigrade for a period of two hours, if the switch has not changed to the closed (high vacuum) state at any time during this two hour period then a leak is presumed to be present and an indication is provided to an electronic error manager for managing the illumination of a malfunction indicator lamp (MIL). It is normally the case for the error manager to operate such that two consecutive tests have to indicate the presence of a leak before the MIL is illuminated and so a single detection of a leak would not in this case result in illumination of the MIL. If at any time during the extended period of checking the switch changes to the closed (high vacuum) state for a period of ten minutes, then this is taken as an indication that no leak is present and the test is passed.

If the temperature does not fall at least six degrees centigrade during the two hour test period or the engine is not off for long enough then a no test will be the result and the MIL is not illuminated.

The inventors have found via test work that the above method, although reliable for indicating the presence of leaks of the required size, is not totally accurate in that leaks smaller than 0.5 mm can also result in a test failure. This is disadvantageous in that it results in the illumination of the MIL in circumstances where a leak of the 0.5 mm size is not present thereby requiring a user of the vehicle to unnecessarily take their vehicle in for checking and may result in expensive components being erroneously replaced thereby resulting in unnecessary cost to the manufacturer or to a user of the vehicle.

FIG. 5 shows the results of test work conducted using an evaporative emission system having no leak, a 0.25 mm diameter leak and a 0.5 mm leak (the size that must be detectable to meet US federal legislation).

In forty-nine tests of the sealed system no erroneous results were produced and the system was correctly identified as being sealed thirty-one times but there was a relatively high level (eighteen) of no results due primarily to the long length of time required to conduct the test and the fact that the minimum temperature drop of six degrees centigrade was not achieved.

In twenty-three tests of a system with a 0.5 mm leak, a leak was detected in five cases and there were no false sealed system results but there was once again a large number (eighteen) of no results.

In seventy-nine tests of a system with a 0.25 mm leak, the system was correctly identified as being sealed (that is to say having a leak less than the 0.5 mm requirement) twenty-five times, there were forty-three no results and there were eleven erroneous results where a leak was indicated but in fact the leak is less than the 0.5 mm requirement.

One explanation for these eleven erroneous can best be understood with reference to FIGS. 4A and 4B of the drawing.

In FIG. 4A there is shown the result of a test for a 0.25 mm leak when the temperature is reduced rapidly. In this case the rapid reduction in temperature produces a sudden increase in vacuum (sudden reduction in absolute pressure) and the switch output will change because the pressure will fall below the switch closure pressure.

However, as shown in FIG. 4B for the same 0.25 mm leak, if the temperature is reduced slowly the loss in pressure due to the reduction in temperature is partly compensated for by the air entering through the leak and so the vacuum in the system will not reach a high enough level to operate the switch. That is to say, the absolute pressure remains above the switching level.

The inventors have therefore established that there is a problem with the existing system in that a significant number of no results are produced and erroneous indications of a 0.5 mm leak are produced when a leak of this size is not present.

This description provides an improved method and apparatus for on-board leak testing of an evaporative emission control system.

Accordingly, the inventors herein have developed a method and system for leak testing an evaporative emission control system. In one embodiment, the method comprises: applying a vacuum from an engine to an evaporative emission system during an engine stop; and indicating a leak is present in the evaporative emission system when a vacuum in the evaporative emission system is less than a threshold amount after a threshold amount of time.

By applying engine vacuum to the evaporative emission system at engine stop and indicating a leak is present in the evaporative emission system when a vacuum in the evaporative emission system is less than a threshold amount after a threshold amount of time, the inventors have developed a faster and more reliable way to establish leaks in the evaporative emission system, at least under some conditions. For example, the present description allows a leak to be confirmed or denied within a short period of time after an engine stop without having to wait for ambient conditions to change before a determination of system leakage is made.

In another embodiment of the present description, the inventors provide for a vacuum testing method comprising: operating an engine to a generate vacuum; applying said generated vacuum to a fuel system component after a request to stop said engine; shutting down said engine; indicating a leak of said fuel system component in response to a change of a vacuum in said fuel system component while said engine is stopped.

In this way, engine vacuum may be applied to at least a fuel system component at engine shut-down so that vacuum leaks may be detected. Since the engine continues to rotate even as fuel and spark are deactivated, the engine generates vacuum in the intake manifold that may be used to leak test fuel system components after the engine is stopped. Further, the vacuum in the fuel system component and/or in the evaporative emission system may be set at a value between atmospheric pressure and engine intake manifold pressure. Thus, the system and method described herein provides for testing with a range of vacuum levels in the fuel system components and/or in the evaporative emission system.

According to another aspect of the description there is provided vacuum testing method for an evaporative emission control system of a motor vehicle having an engine wherein the method comprises using a vacuum decay test having the steps of predicting the vacuum in the system when an engine switch off event occurs, predicting for a leak of a predetermined size, a time period required for the vacuum in the evaporative emission control system to decay to a predetermined level of vacuum, checking whether the vacuum has fallen below the predetermined level and, if the vacuum has not fallen below the predetermined level, using this as an indication that a leak greater than the predetermined leak is not present in the evaporative emission control system.

The evaporative emission control system may include a vacuum operated switch having a first high vacuum state when the system is above the predetermined level of vacuum and a second low vacuum state when the system is below the predetermined level of vacuum for use in determining the presence of a leak in the evaporative emission control system and the method may comprise predicting the vacuum in the system when an engine switch off event occurs, predicting for a leak of a predetermined size, a time period required for the vacuum in the evaporative emission control system to decay sufficiently to cause a change in state of the switch from the first state to the second state, checking the status of the switch after the engine switch off event has occurred and, if the state of the switch at the end of the predicted time period is in the first high vacuum state, using this as an indication that a leak greater than the predetermined leak is not present in the evaporative emission control system.

Predicting a time period required for the vacuum to decay sufficiently to cause a change in state of the switch from the first high vacuum state to the second low vacuum state may further comprise determining the level of fuel in a fuel tank forming part of the evaporative emission control system and varying the predicted time based upon the level of fuel in the fuel tank.

Predicting a time period required for the vacuum to decay sufficiently to cause a change in state of the switch from the first high vacuum state to the second low vacuum state may comprise using a look up table to provide a predicted time period based upon predicted vacuum at engine switch off and the level of fuel in the fuel tank.

Predicting a time period required for the vacuum to decay sufficiently to cause a change in state of the switch from the first high vacuum state to the second low vacuum state may further comprise varying the predicted time based upon whether a pressure control valve forming part of the evaporative emission control system is open or closed.

The method may further comprise checking at predetermined intervals the status of the switch after the engine switch off event has occurred for the duration of the predicted time period and, if the state of the switch for the duration of the predicted time period has remained in the first high vacuum state, using this as an indication that a leak greater than the predetermined leak is not present in the evaporative emission control system.

The method may further comprise using a change in state of the switch from the first high vacuum state to the second low vacuum state as an indication that a leak greater than the predetermined leak is present in the evaporative emission control system.

If the result of the vacuum decay test indicates the presence of a leak greater than the predetermined leak the method may further comprise carrying out a natural vacuum leak detection test and using the result from the natural vacuum leak detection test as a final diagnostic output.

The method may further comprise determining whether the operating conditions of the evaporative emission control system are suitable for vacuum decay testing and, if the conditions are not suitable for testing, not conducting the vacuum decay test.

If the evaporative emission control system is determined to be not suitable for vacuum decay testing, the method may further comprise carrying out a natural vacuum leak detection test and using the result from the natural vacuum leak detection test as a final diagnostic output.

Predicting for a leak of a predetermined size, a time period required for the vacuum in the evaporative emission control system to decay to the predetermined level of vacuum may further comprise determining the level of fuel in a fuel tank forming part of the evaporative emission control system and varying the predicted time based upon the level of fuel in the fuel tank.

Predicting for a leak of a predetermined size, a time period required for the vacuum in the evaporative emission control system to decay to the predetermined level of vacuum may comprise using a look up table to provide a predicted time period based upon predicted vacuum at engine switch off and the level of fuel in the fuel tank.

Predicting for a leak of a predetermined size, a time period required for the vacuum in the evaporative emission control system to decay to the predetermined level of vacuum may further comprise varying the predicted time based upon whether a pressure control valve forming part of the evaporative emission control system is open or closed.

A first look up table may be used if the pressure control valve is closed and a second look up table may be used if the pressure control valve is open.

According to a further aspect of the description there is provided an evaporative emission control system for a motor vehicle having an engine, the evaporative emission control system comprising, a fuel tank, a carbon canister fluidly connected to the fuel tank and to an inlet manifold of the engine via a purge valve, a vacuum operated switch having a first high vacuum state when the system is above a predetermined level of vacuum and a second low vacuum state when the system is below the predetermined level of vacuum for use in determining the presence of a leak in the evaporative emission control system and an electronic controller operable to receive an output from the switch indicative of its current operating state wherein the electronic controller is operable to perform a vacuum decay test by using a prediction of the vacuum in the system when an engine switch off event occurs, a predicted time period required for the vacuum in the evaporative emission control system to decay sufficiently to cause a change in state of the switch from the first state to the second state for a leak of a predetermined size, monitoring the status of the switch after the engine switch off event has occurred and, if the state of the switch at the end of the predicted time period is determined to be in the first high vacuum state, use this as an indication that a leak greater than the predetermined leak is not present in the evaporative emission control system.

The electronic controller may be further operable to check at predetermined intervals the status of the switch after the engine switch off event has occurred for the duration of the predicted time period and, if the state of the switch for the duration of the predicted time period is determined to have remained in the first high vacuum state, using this as an indication that a leak greater than the predetermined leak is not present in the evaporative emission control system.

The electronic controller may be further operable to use a change in state of the switch from the first high vacuum state to the second low vacuum state as an indication that a leak greater than the predetermined leak is present in the evaporative emission control system.

If the result of the vacuum decay test indicates the presence of a leak greater than the predetermined leak the electronic controller may be further operable to conduct a natural vacuum leak detection test on the evaporative emission control system and use the result from the natural vacuum leak detection test as a final diagnostic output.

The electronic controller may be further operable to determine whether the operating conditions of the evaporative emission control system are suitable for vacuum decay testing and, if the conditions are not suitable for testing, the electronic controller is operable to abort vacuum decay testing and provide a no test output.

If the evaporative emission control system is determined to be not suitable for vacuum decay testing, the electronic controller may be operable to carrying out a natural vacuum leak detection test and use the result from the natural vacuum leak detection test as a final diagnostic output.

Predicting a time period required for the vacuum to decay sufficiently to cause a change in state of the switch from the first high vacuum state to the second low vacuum state may further comprise the electronic controller determining from a sensor the level of fuel in the fuel tank and varying the predicted time based upon the level of fuel in the fuel tank.

The electronic controller may be operable to use a look up table to provide a predicted time period based upon predicted vacuum at engine switch off and the level of fuel in the fuel tank.

The evaporative emission control system may further comprise a pressure control valve and predicting a time period required for the vacuum to decay sufficiently to cause a change in state of the switch from the first high vacuum state to the second low vacuum state may further comprises the electronic controller varying the predicted time based upon whether the pressure control valve is open or closed.

A first look up table may be used by the electronic controller to predict the time period if the pressure control valve is closed and a second look up table may be used by the electronic controller to predict the time period if the pressure control valve is open.

BRIEF DESCRIPTION OF THE DRAWINGS

The description will now be described by way of example with reference to the accompanying drawing of which:

FIG. 5 is a table showing the results from test work using a prior art natural vacuum leak detection test;

FIG. 6 is a table showing the results from vacuum delay tests performed in accordance with a method according to this description;

DETAILED DESCRIPTION

Figure 1:
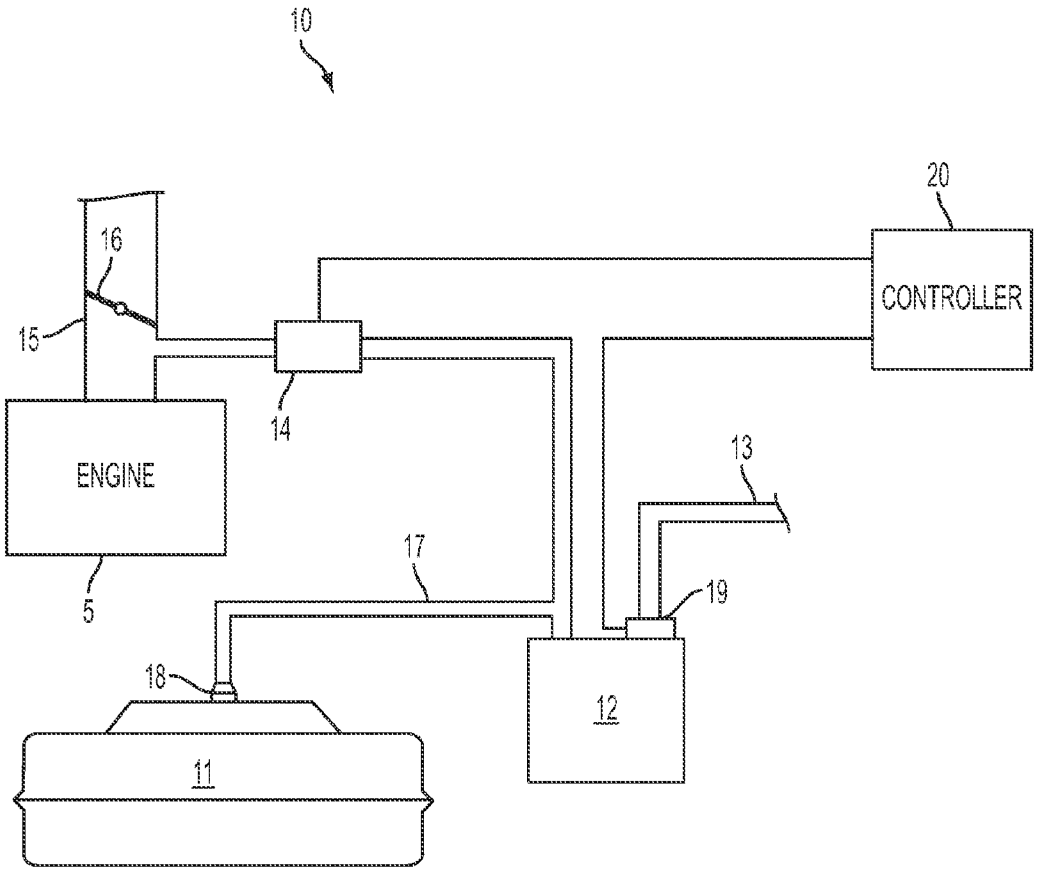
FIG. 1 is a block diagram of an evaporative emission control system according to one aspect of the description.

Referring firstly to FIG. 1 there is shown an evaporative emission control system 10 comprising a fuel tank 11, a carbon canister 12, a purge valve 14, a combined switch and valve assembly 19 and an electronic controller 20.

A conduit 17 fluidly links the fuel tank 11 to the canister 12 and the purge valve 14. The purge valve 14 controls the flow of fuel vapours from the fuel tank 11 and the canister 12 to an inlet manifold 15 of an engine 5 to which is mounted a throttle valve 16. A connecter 18 is used to connect the conduit 17 to an upper portion of the fuel tank 11 in which resides fuel vapour produced by evaporation of the fuel stored in the fuel tank 11. In one embodiment, fuel tank 11, conduit 17, and canister 12 comprise an enclosed volume for storing fuel and/or fuel vapour. Other embodiments may be comprised of additional or fewer components, and the figures and description are not intended to limit the scope of possible enclosed volume configurations for storing fuel and/or fuel vapour.

The switch and valve assembly 19 may be of various configurations and includes a valve that can selectively connect the canister 12 to atmosphere via a conduit 13 and a vacuum operated switch that is switchable between open and closed states by the level of vacuum in the canister 12.

In one embodiment of the switch it is arranged to be in an open state when the vacuum in the canister is less than 2.5 mb [250 Pa] and is in a closed state when the vacuum in the canister 12 is more than 2.5 mb [250 Pa]. That is to say, the switch has a first high vacuum state when vacuum in the system 10 (as sensed in this case in the canister 12) is greater than 2.5 mb [250 Pa] and a second low vacuum state when the vacuum in the system 10 (as sensed in this case in the canister 12) is less than 2.5 mb [250 Pa]. The value of 2.5 mb [250 Pa] is a predetermined level of vacuum in the system chosen for this embodiment it will be appreciated that other predetermined values of vacuum could be used.

It will be appreciated that in practice there may be hysteresis in the switch so that the switching level will be slightly different depending upon whether the vacuum is increasing or decreasing however for the purposes of describing this description it will be assumed that there is no hysteresis present in the operation of the switch.

As will be described hereinafter, the switch is used for determining whether there is a leak in the evaporative emission control system. It will also be appreciated that the switch could operate so as to be open in the high vacuum state and closed in the low vacuum state. As previously mentioned, the term low vacuum state means a vacuum for which the absolute pressure is between the switching level absolute pressure and atmospheric pressure and the term high vacuum state means a vacuum for which the absolute pressure is less than the switching level absolute pressure.

The valve of the switch and valve assembly 19 is provided to control under and over pressure in the evaporative emission control system 10 and functions as a pressure control valve. In one embodiment of the switch and valve assembly 19 the valve will open when the a vacuum of 6.5 mb is reached and will remain open until the vacuum falls to 3.5 mb [350 Pa] and will also open when a positive pressure of 2.5 mb is reached and will remain closed between these pressures.

Examples of such valve and switch assemblies can be found in U.S. Pat. Nos. 6,823,850, 7,047,950 and 7,216,636 referred to above.

The electronic controller 20 includes a central processing unit and memory and is operable to control opening and closing of the purge valve 14 and receives a feedback from the switch and valve assembly 19 of the operating state of the switch. The switch and valve assembly 19 may be of a smart type and monitor the state of the switch and the temperature and provide a signals indicative of these to the electronic controller 20.

Operation of the evaporative emission control system 10 is conventional in nature and will not be described in detail other than to say that the canister 12 stores during certain conditions fuel vapour and then releases the fuel vapour to the engine when the purge valve 14 opens and a vacuum is present in the inlet manifold 15 thereby reducing pollution of the atmosphere.

Figure 2:
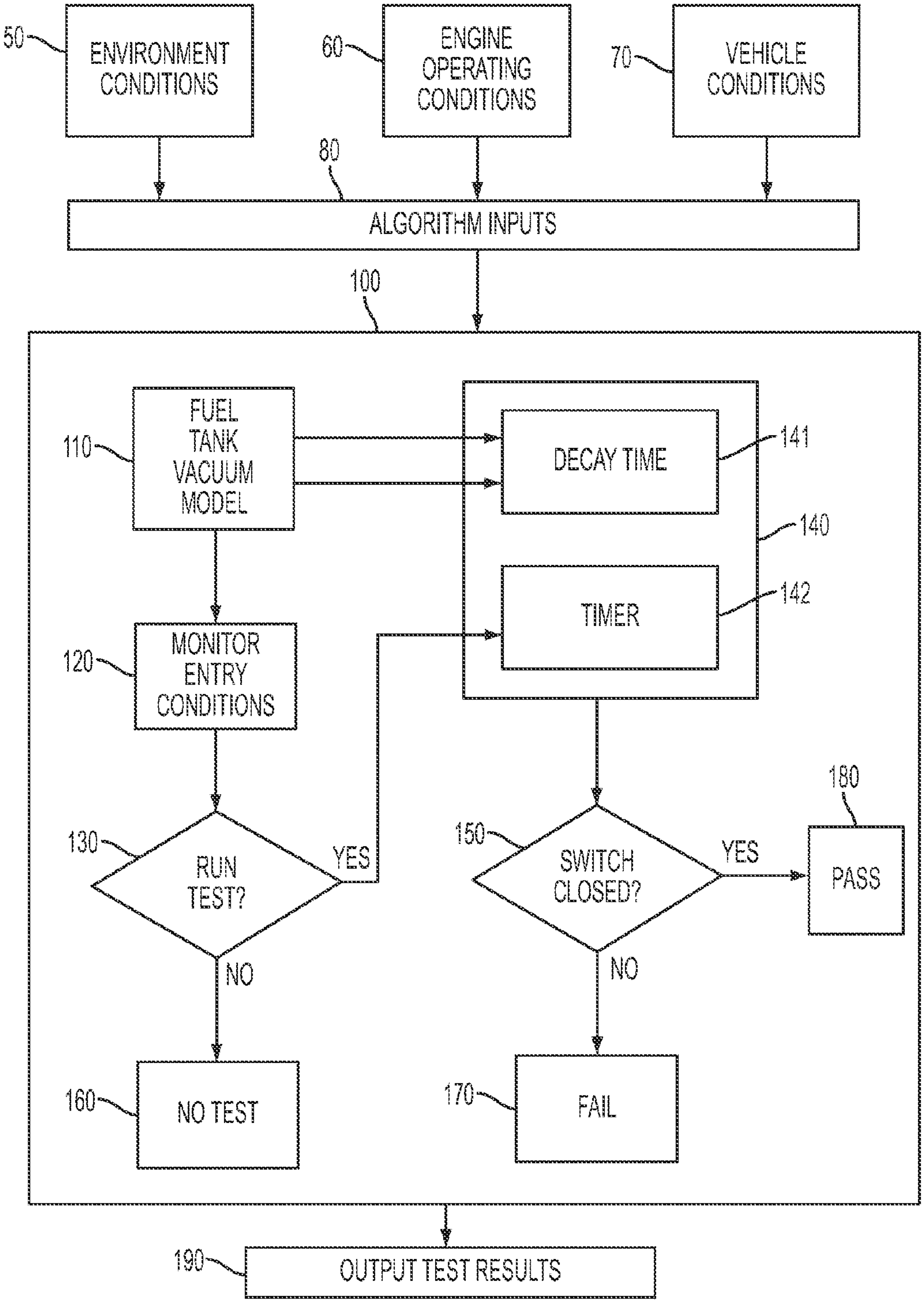
FIG. 2 is a high level diagram showing the inputs and steps of a vacuum decay testing method according to one aspect of the description.
Figure 3:
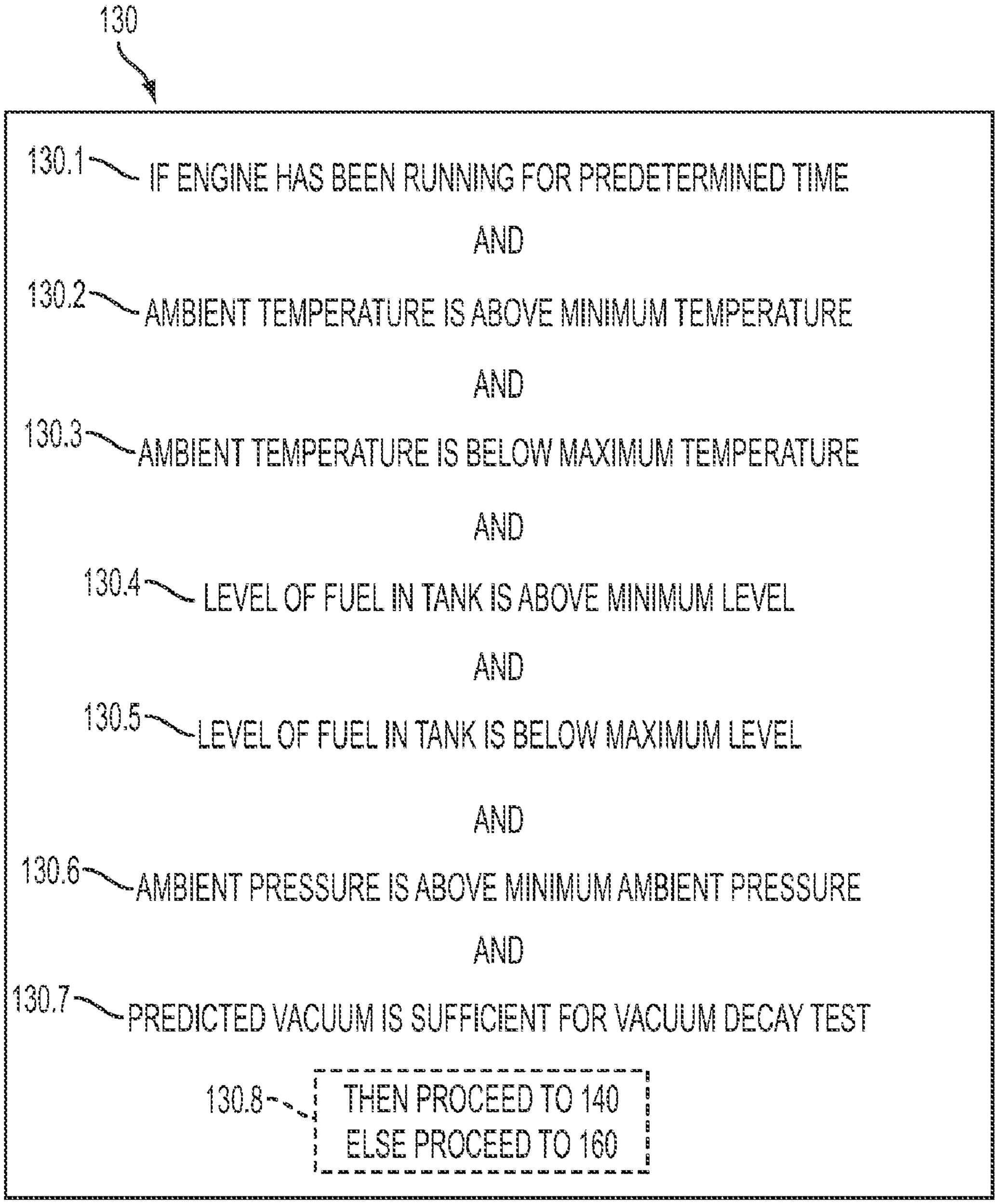
FIG. 3 is a more detailed view of block 130 on FIG. 2 showing the basic logic used to determine whether vacuum decay testing is possible.
Figure 4A:
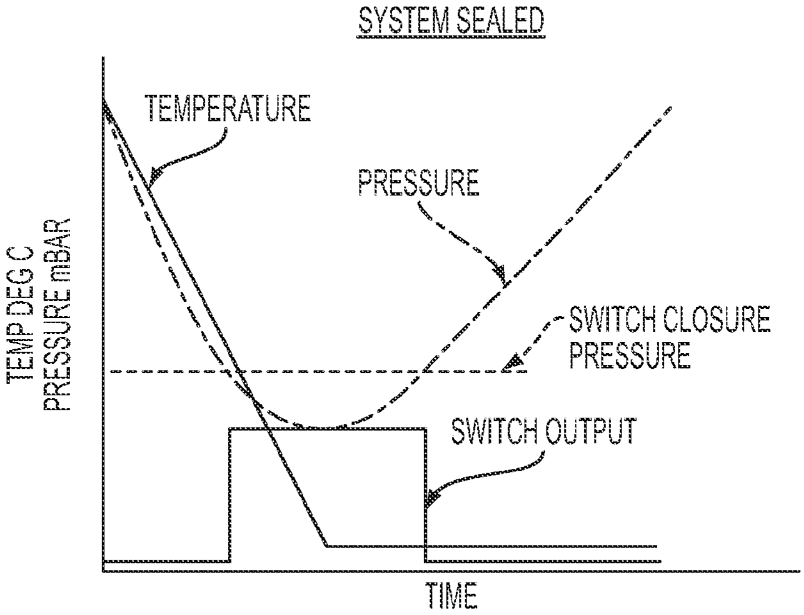
FIG. 4A is a chart showing the variation of pressure with temperature for a evaporative emission control system with a 0.25 mm leak when the temperature is rapidly reduced and the corresponding output from a vacuum operated switch.
Figure 4B:
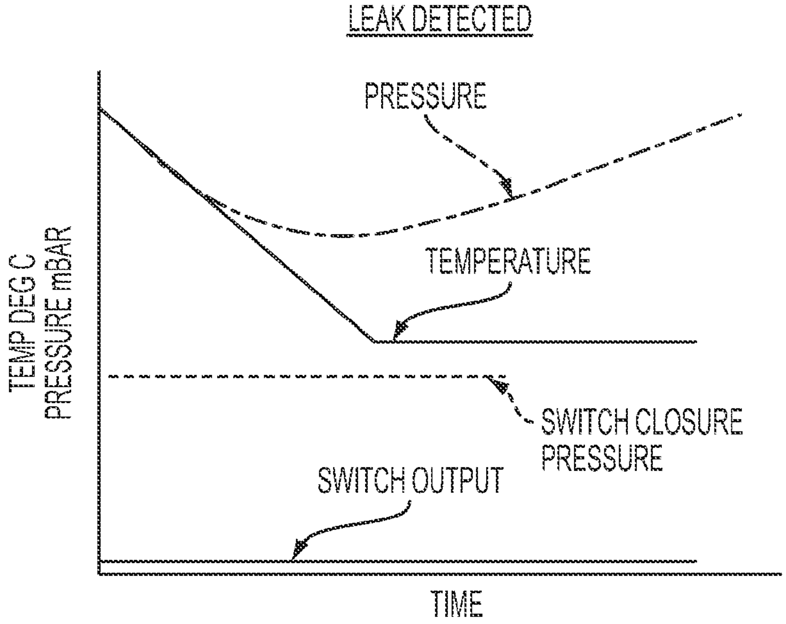
FIG. 4B is a chart showing the variation of pressure with temperature for an evaporative emission control system with a 0.25 mm leak when the temperature is reduced slowly and the corresponding output from a vacuum operated switch.

Referring now to FIGS. 2 and 3 there is shown the various inputs and operations performed by the electronic controller 20 in order to perform a method according to this description.

As indicated in block 50 environmental conditions such as ambient pressure and ambient temperature are obtained.

As indicated in block 60 engine operating conditions such as engine running state (on/off), engine running time, time since engine stop, the pressure in the inlet manifold 15, the temperature of the engine and the position of the canister purge valve 14 are obtained and, as indicated in block 70, information relating to other vehicle conditions such as the level or amount of the fuel in the fuel tank 11 and the state of the switch forming part of the switch and valve assembly 19 is obtained.

Then, as indicated by block 80, the information obtained in blocks 50, 60 and 70 is input to the electronic controller 20 in order for it to execute a number of algorithms. It will be appreciated that this information can be obtained by sensors on the vehicle.

Block 100 indicates the various steps and actions required by the electronic controller 20 in order to execute a vacuum decay test method according to this description.

Block 110 indicates that a predicted vacuum in the fuel tank is calculated during engine running using a fuel tank vacuum model.

In modelling the fuel tank vacuum, the creation and depletion of vacuum within the fuel tank is assumed to be of a first order type response using a steady state value and a time constant. The steady state vacuum and the time constant are calculated from a series of lookup tables that have been populated with data from experimental work in a controlled environment. The steady state value is based on the manifold pressure and the purge valve opening position with modifiers for fuel tank level and ambient pressure and temperature. The time constant is based on fuel level and purge valve opening position and is also dependant on engine running state and whether the combined switch and valve assembly is open, thus relieving vacuum to atmosphere or not. The vacuum relief state of the combined switch and valve is also determined by the fuel tank model.

The fuel tank vacuum is modelled because experimentation has shown that on engine switch off, the evaporative system pressure equalises to that of the fuel tank, thus indicating the vacuum present at the vacuum switch.

Although not specifically indicated in FIG. 2 the use of the vacuum decay test is initiated when the engine running state changes from running to off. Prior to a change in engine state the engine may be operating and generating vacuum in the intake manifold. The change in state of the engine is used to start the vacuum decay method, the first step of which is shown in block 120. At the time of change in state of the engine the engine may be running such that a vacuum is present in the engine intake manifold. The change in state of the engine may be indicated by a request to stop the engine from an operator or a control sub-system. The change in engine state may initiate an engine stop sequence where the engine is shutdown and engine fuel and spark are deactivated while the engine is rotating.

Block 120 shows that various variables are collated from the information input from blocks 50, 60 and 70. These variables include, from block 50, the ambient pressure and temperature, from block 60, the time the engine has been running and, from block 70, the level of fuel in the fuel tank 11.

Then at block 130 it is determined whether the current state of the evaporative emission control system 10 is suitable for vacuum decay testing. As best seen in FIG. 3 the decision made in block 130 is based on the combination of a number of separate decisions.

Decision 130.1 determines whether the engine has been running for a predetermined period of time. If the engine has been running longer than the predetermined period of time before it was switched off then vacuum decay testing can be reliably performed. It will be appreciated that the state of an engine may be unstable in many respects shortly after start-up and it may not be possible to reliably test the evaporative emission control system in these circumstances.

Decision 130.2 determines whether the ambient temperature is above a minimum ambient temperature, if it is, then the vacuum decay test can be reliably used. Thus, vacuum can be applied from the engine to the evaporative emission system during an engine stop when a temperature is above a threshold temperature.

Decision 130.3 determines whether the ambient temperature is below a maximum temperature, if it is, then the vacuum decay test can be reliably used. Thus, vacuum can be applied from the engine to the evaporative emission system during an engine stop when a temperature is below a threshold temperature.

Decision 130.4 determines whether the level of fuel in the fuel tank is above a minimum level, if it is, then the vacuum delay test can be reliably used. In one example, the minimum fuel tank level may be in the order of 15%. Thus, vacuum can be applied from the engine to the evaporative emission system during an engine stop when a level of a fuel tank in the evaporative emission system is above a threshold level.

Decision 130.5 determines whether the level of fuel in the fuel tank is below a maximum level, if it is, then the vacuum decay test can be reliably used. In one embodiment, the maximum fuel tank level may be in the order of 85%. Thus, vacuum can be applied from the engine to the evaporative emission system during an engine stop when a level of a fuel tank in the evaporative emission system is below a threshold level.

Decision 130.6 determines whether the ambient pressure is above a minimum ambient pressure, if it is then the vacuum decay test can be reliably used.

Decision 130.7 determines whether the predicted vacuum in the evaporative emission control system 10, as determined in block 110, is higher than the vacuum level at which the state of the switch changes, if it is then the vacuum delay test can be used. It will be appreciated that the vacuum must be higher than the switching level or predetermined vacuum at which switching occurs in order for the decay in vacuum to be sensed by the switch. For example and without limitation, for the switching level or predetermined vacuum of 2.5 mb [250 Pa] used in this example, the starting vacuum must be at least 3.5 mb [350 Pa].

Note that in order for testing to commence all of the decisions 130.1 to 130.7 have to be met, if they are, then, as indicated at 130.8, the method advances to block 140 but, if one or more of the decisions 130.1 to 130.7 are not met, then vacuum decay testing is aborted and the result is a no test and the method advances to block 160.

If all of the decisions 130.1 to 130.7 are positive then in block 140 vacuum decay testing commences by predicting a time period for a specific size leak during which the vacuum in the system will remain above the level required to affect a change of switch state from the high vacuum state to the low vacuum state. Although in the embodiment of the switch described herein the switching level or predetermined level of vacuum is 2.5 mb [250 Pa] it will be appreciated that other switching levels could be used.

Thus, engine vacuum can be applied from the engine to a fuel system component that is part of the evaporative system during an engine stop sequence. The vacuum may be applied immediately after a request to stop or after a delay period.

Therefore the prediction performed in block 140 is, given the predicted current vacuum in the system as provided in block 110 by the fuel tank vacuum model, how long will it take for the vacuum in the system to fall to 2.5 mb [250 Pa] assuming the presence of a leak of a predetermined size (which in this case is 0.25 mm diameter). This prediction then provides a time threshold for testing purposes that is used in block 142.

The prediction performed in block 140 is performed by using one or more look up tables to determine this period of time. In one embodiment two sets of look up tables of fuel tank level versus predicted vacuum are used, the first set of look up table relates to a predicted vacuum decay when the valve portion of the switch and valve assembly 19 is closed and the other set relates to a predicted vacuum decay when the valve portion of the switch and valve assembly 19 is open. In each set of look up tables there are various tables for different combinations of ambient temperature and ambient pressure and so by using current values of these obtained from block 50, the fuel tank level from block 70 and the predicted vacuum from block 110 a value for the time threshold can be obtained. The look up tables are produced by experimental work in a controlled environment in which temperature and pressure can be varied.

In block 141, the decay time may be determined by looking up values stored in tables based on empirical testing or models. In one embodiment, the time may be a threshold amount of time that is related to an amount of fuel stored in a fuel tank. In another embodiment, a threshold time is related to the vacuum present in the engine intake manifold at the time an engine stop is requested or at some time while the engine is rotating after the request to stop the engine. In another embodiment, the threshold time may be related to the amount of fuel stored in the vehicle fuel tank and the vacuum present in the engine intake manifold at the time of an engine stop request.

Block 142 is a timer that is set to the time threshold determined in 141, when the timer ends the state of the switch is checked at block 150 and depending upon the state of the switch an inferred leak condition is produced.

If at block 150 the switch is determined to be in the high vacuum state, which in this case means the switch is closed, then at block 180 the evaporative emission control system 10 has passed the vacuum decay test and no leak is assumed to be present.

However, if at block 150 the switch is determined to be in the low vacuum state, which in this case means that the switch is open, then at block 170 the evaporative emission control system 10 has failed the vacuum decay test and a leak is assumed to be present.

In an alternative embodiment, a pressure sensor or the pressure switch may be used to monitor vacuum in the evaporative emission control system. In such an embodiment, output from the pressure senor can be monitored for a threshold amount of time to determine if a leak is present in the evaporative emission system. The threshold amount of time may be related to the amount of fuel stored in a fuel tank, the ambient temperature and pressure, and/or the amount of engine vacuum applied to the evaporative emission system.

The results of the vacuum decay leak test as characterised by the blocks 160, 170 and 180 are then output to an error manager which in this case is formed as part of the electronic controller 20 as indicated by block 190.

The method may alternatively comprise checking at predetermined intervals such as 100 milliseconds the status of the switch after the engine switch off event has occurred for the duration of the predicted time period and, if the state of the switch for the duration of the predicted time period has remained in the first high vacuum state, using this as an indication that a leak greater than the predetermined leak is not present in the evaporative emission control system. This has the advantage that if a leak is found by the switch changing state the size of the leak can be estimated by knowing how many checks had been successfully completed before a change in switch state was sensed.

Figure 7:
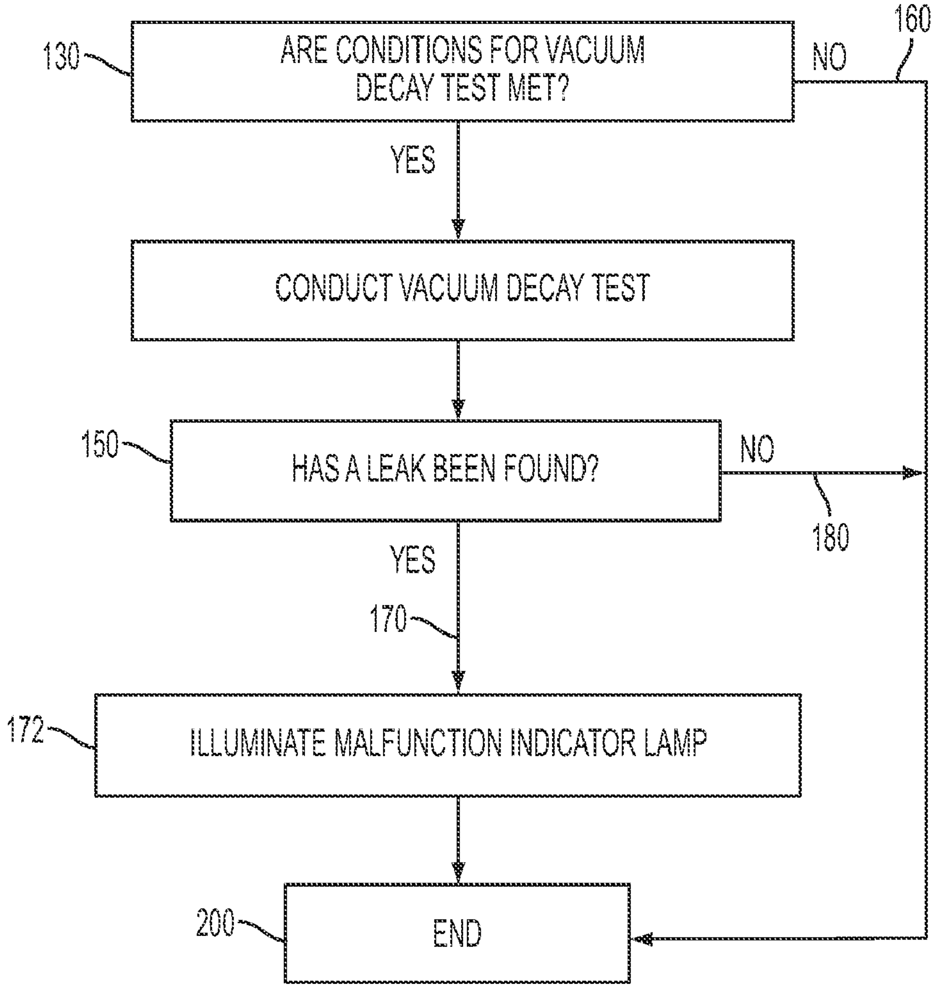
FIG. 7 is a high level flow chart of a method according to one embodiment of the description.

If the test is passed, as indicated by block 180, then the electronic controller 20 can go into sleep mode to save energy and the evaporative emission control system testing is complete and will not be repeated until the engine has been run again and stopped. However, if the test has been failed, as indicated by block 170, the electronic controller 20 in a first embodiment, shown in FIG. 7 (for which the same references numerals are used for common steps as are used in FIG. 2), operates so as to illuminate a malfunction indicator lamp (not shown).

In this first embodiment, if the conditions for vacuum decay testing are not met in block 130 then the method ends at 200.

If the conditions for vacuum decay testing are met in block 130, then the vacuum decay test is performed and, in block 150, it is determined whether a leak has been found. If no leak has been found then via step 180 the method ends in block 200 but, if a leak has been found the method advances to block 172 where the MIL is illuminated by the error manager. However, the error manager may operate so as to only illuminate the MIL after two consecutive leaks have been detected.

Figure 8:
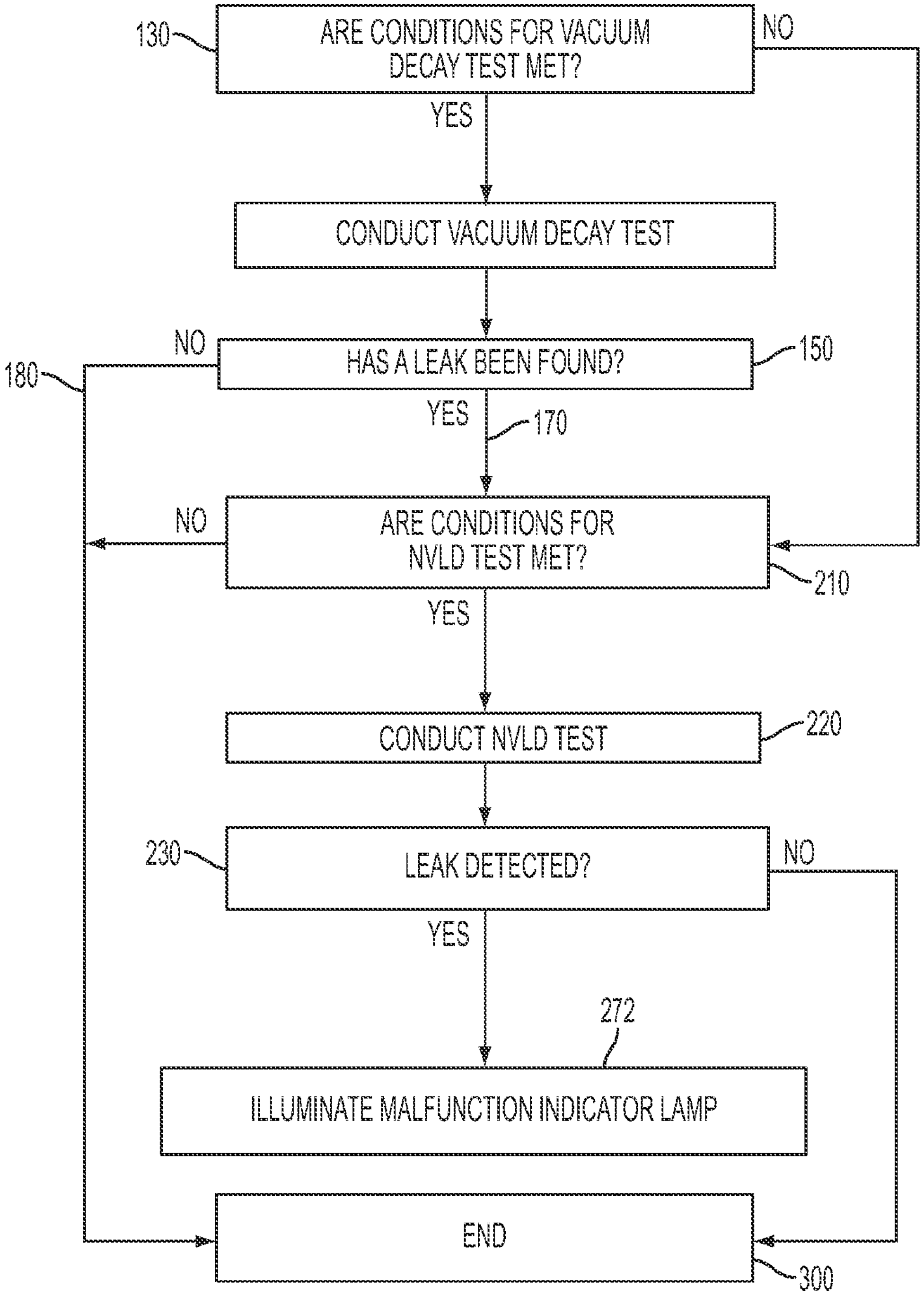
FIG. 8 is a high level flow chart of a method according to an alternative embodiment of the description.

In a second embodiment, shown in FIG. 8, the detection of a leak or a no test result from the vacuum decay test results in the electronic controller 20 using the switch and valve assembly 19 to run a natural vacuum leak detection test 'NVLD' to verify the fail result from the vacuum decay test or produce a positive or negative leak result if the vacuum decay test result was a no test.

In this second embodiment if the conditions for vacuum decay testing are not met in block 130 then the method advances to block 210 to determine whether the conditions for natural vacuum leak detection testing are present and, if they are, the method advances to step 220 otherwise the method ends at block 300.

If at block 130 the conditions for vacuum decay testing are met then a vacuum decay test is performed and at block 150, it is determined whether a leak has been found. If no leak has been found then via step 180 the method ends in block 300 but, if a leak has been found the method advances via block 170 to block 210 referred to above to determine whether the conditions for natural vacuum leak detection testing are present and, if they are, the method advances to step 220 otherwise the method ends at block 300.

After conducting the NVLD test at block 220 it is determined at block 230 whether a leak has been detected and if it has the method advances to block 272 where a MIL is illuminated otherwise the method ends at block 300. As before, the error manager may operate so as to only illuminate the MIL after two consecutive leaks have been detected.

FIG.6 shows the results of vacuum decay testing from which it can be seen for a 0.25 mm diameter leak that there were only twelve 'no results' from 121 tests and only one occurrence where a leak was erroneously detected and the system was correctly determined to be sealed for 108 of the 121 tests. For the 0.5 mm diameter leak which is the size of leak that is required to be detected a leak was correctly detected 130 times from 138 tests there were no erroneous system sealed results and only eight 'no results' from the 138 tests.

The vacuum decay test therefore reduces the number of 'no results' and the occurrence of erroneous findings of a leak when a 0.25 mm diameter leak is used and the leak being tested for is 0.5 mm. That is to say, using a 0.25 mm leak the 'NVLD' test produced eleven erroneous findings of a 0.5 mm leak from seventy-nine tests (an error rate of 13.9%) whereas the vacuum decay test according to this description produced only none erroneous result of a 0.5 mm leak from 121 tests (an error rate of 0.826%).

One advantage of the use of a vacuum decay test is that it is very quick to perform generally taking no longer than sixty seconds from engine switch off.

A second advantage of the use of a vacuum decay test according to this description is that it uses the same evaporative emission control system components as currently used and so there are no component development costs required to put the description into effect and the reliability of key components such as the switch have already been established by many years of in-service use.

A further advantage of the use of the vacuum decay test is that it can be combined with the natural vacuum leak detection test currently used to reduce the number of no test results because the conditions for testing are different in each case and in addition the number of erroneous indications of a leak can be reduced.

Although the description has been described with respect to a vacuum decay test in which the size of the leak is 0.25 mm diameter it will be appreciated that the description is not limited to the use of such a size of leak and that an alternative size of leak could be used. For example in the case of the embodiment shown in FIG. 7 the size of the leak could be such as to meet the appropriate regulations such as for example 0.5 mm.

Although the description has been described with reference to a preferred embodiment in which the state of a switch is used to predict for a leak of a predetermined size, a time period required for the vacuum in the evaporative emission control system to decay to a predetermined level of vacuum, it will be appreciated that a vacuum or absolute pressure sensor could alternatively be used to check the level of vacuum in the system.

It will be appreciated by those skilled in the art that although the description has been described by way of example with reference to one or more embodiments it is not limited to the disclosed embodiments and that one or more modifications to the disclosed embodiments or alternative embodiments could be constructed without departing from the scope of the description as set out in the appended claims.

The invention claimed is:

1. A vacuum testing method for an evaporative emission control system, comprising:

applying a vacuum from an engine to a fuel tank during an engine stop sequence; and indicating a leak is present in said evaporative emission system when a vacuum in the evaporative emission system is less than a threshold amount after a threshold amount of time, wherein said threshold amount of time is related to an amount of fuel in the fuel tank, and wherein said vacuum is applied from said engine when a temperature is above a minimum threshold temperature, and when the temperature is below a maximum threshold temperature, and wherein said vacuum is applied from said engine when a level of a fuel tank in said evaporative emission system is above a minimum threshold level and below a maximum threshold level.

2. The method of claim 1, wherein said threshold amount of time is also related to said vacuum applied from said engine.

* * * * *